United States Patent
Lapp et al.

(10) Patent No.: US 8,280,217 B2
(45) Date of Patent: Oct. 2, 2012

(54) HOLDING APPARATUS FOR SPLICE PROTECTION DEVICES WITH SPLICES, ACCOMMODATED IN THE SPLICE PROTECTION DEVICES, OF OPTICAL WAVEGUIDES

(75) Inventors: Oliver Lapp, Wuppertal (DE); Roman Syplacz, Hagen (DE)

(73) Assignee: CCS Technology, Inc., Wilmington, DE (US)

( * ) Notice: Subject to any disclaimer, the term of this patent is extended or adjusted under 35 U.S.C. 154(b) by 53 days.

(21) Appl. No.: 12/861,345

(22) Filed: Aug. 23, 2010

(65) Prior Publication Data

US 2010/0316348 A1   Dec. 16, 2010

Related U.S. Application Data

(63) Continuation of application No. PCT/EP2009/000929, filed on Feb. 11, 2009.

(30) Foreign Application Priority Data

Feb. 28, 2008  (DE) .................. 20 2008 002 812 U

(51) Int. Cl.
*G02B 6/00* (2006.01)
(52) U.S. Cl. ........................................ 385/137
(58) Field of Classification Search ........... 385/134–137
See application file for complete search history.

(56) References Cited

U.S. PATENT DOCUMENTS

| | | | | |
|---|---|---|---|---|
| 5,515,472 A | * | 5/1996 | Mullaney et al. | 385/135 |
| 6,061,492 A | * | 5/2000 | Strause et al. | 385/135 |
| 6,192,180 B1 | | 2/2001 | Kim et al. | 385/135 |
| 7,310,471 B2 | * | 12/2007 | Bayazit et al. | 385/135 |
| 2010/0183274 A1 | * | 7/2010 | Brunet et al. | 385/135 |

FOREIGN PATENT DOCUMENTS

| | | |
|---|---|---|
| DE | 202007012420 U1 * | 12/2007 |
| GB | 2254163 A | 9/1992 |
| WO | 2007/129953 A1 | 11/2007 |
| WO | 2008/033997 A1 | 3/2008 |

OTHER PUBLICATIONS

German Patent Office, German Search Report for German Application No. 202008002812.4, Oct. 14, 2008, 4 pages.
Patent Cooperation Treaty, International Search Report for International Application No. PCT/EP2009/000929, Apr. 27, 2009, 3 pages.

* cited by examiner

*Primary Examiner* — Daniel Petkovsek
(74) *Attorney, Agent, or Firm* — John H. Vynalek

(57) ABSTRACT

The invention relates to a holding apparatus for splice protection devices with splices, accommodated in the splice protection devices, of optical waveguides, with a base wall and a plurality of separating elements which engage on the base wall, the separating elements demarcating accommodating regions from one another which run substantially parallel to one another for in each case at least one splice protection device. According to the invention, at least some accommodating regions are delimited at least one longitudinal side by in each case at least one first separating element, which has a dimensionally stable section and at least one elastically deformable section, the dimensionally stable section engaging on the base wall, the or each elastically deformable section engaging on the dimensionally stable section in such a way that the former protrudes, in an unformed initial position, into the respective accommodating region while reducing the effective width thereof and can be elastically deformed out of the initial position while enlarging the effective width of the respective accommodating region for the purpose of inserting a splice protection device into the respective accommodating region.

10 Claims, 3 Drawing Sheets

HOLDING APPARATUS FOR SPLICE PROTECTION DEVICES WITH SPLICES, ACCOMMODATED IN THE SPLICE PROTECTION DEVICES, OF OPTICAL WAVEGUIDES

PRIORITY APPLICATIONS

This application is a continuation of International Application No. PCT/EP09/000929 filed Feb. 11, 2009, which claims priority to German Application No. 202008002812.4 filed Feb. 28, 2008, the contents of both applications being incorporated herein by reference.

TECHNICAL FIELD

The invention relates to a holding apparatus for splice protection devices with splice, accommodated in the splice protection devices, of optical waveguides in accordance with the preamble of claim 1.

BACKGROUND

DE 20 2007 012 420 U1 has disclosed a holding apparatus for splice protection devices with splices, accommodated in the splice protection devices, of optical waveguides, which holding apparatus has a base wall and a plurality of separating elements which engage on the base wall, the separating elements demarcating accommodating regions from one another which run substantially parallel to one another for in each case one splice protection device. The dimensionally stable separating elements of this holding apparatus are designed and positioned relative to one another in such a way that the accommodating regions, when viewed in the longitudinal direction thereof, have a varying width, with the result that splice protection devices in the accommodating regions are elastically flexible and can be distorted using the dimensionally stable separating elements.

In accordance with DE 20 2007 012 420 U1, accordingly the splice protection devices in the accommodating regions are bent elastically and distorted using the dimensionally stable separating elements, which delimit the accommodating regions for themselves whilst reducing the effective width thereof It is therefore even possible to accommodate splice protection devices with different dimensions effectively in one holding apparatus, but there is a need for a holding apparatus in which splice protection devices with different dimensions can be accommodated and held safely without them being deformed.

SUMMARY

Against this background, the present invention is based on the problem of providing a novel holding apparatus for splice protection devices with splices, accommodated in the splice protection devices, of optical waveguides.

This problem is solved by a holding apparatus according to claim 1. According to the invention, at least some accommodating regions are delimited at at least one longitudinal side by in each case at least one first separating element, which has a dimensionally stable section and at least one elastically deformable section, the dimensionally stable section engaging on the base wall, the or each elastically deformable section engaging on the dimensionally stable section in such a way that the former protrudes, in an unformed initial position, into the respective accommodating region whilst reducing the effective width thereof and can be elastically deformed out of the initial position whilst enlarging the effective width of the respective accommodating region for the purpose of inserting a splice protection device into the respective accommodating region.

In the holding apparatus according to the invention, splice protection devices with different dimensions are accommodated and held in the holding apparatus via elastic deformation of at least one section of the or each first separating element. The splice protection devices as such are accordingly not subject to any elastic deformation in the holding apparatus according to the invention.

Preferred developments of the invention result from the dependent claims and the description below. Exemplary embodiments will be explained in more detail with reference to the drawing, in which:

DETAILED DESCRIPTION

Figure 1:
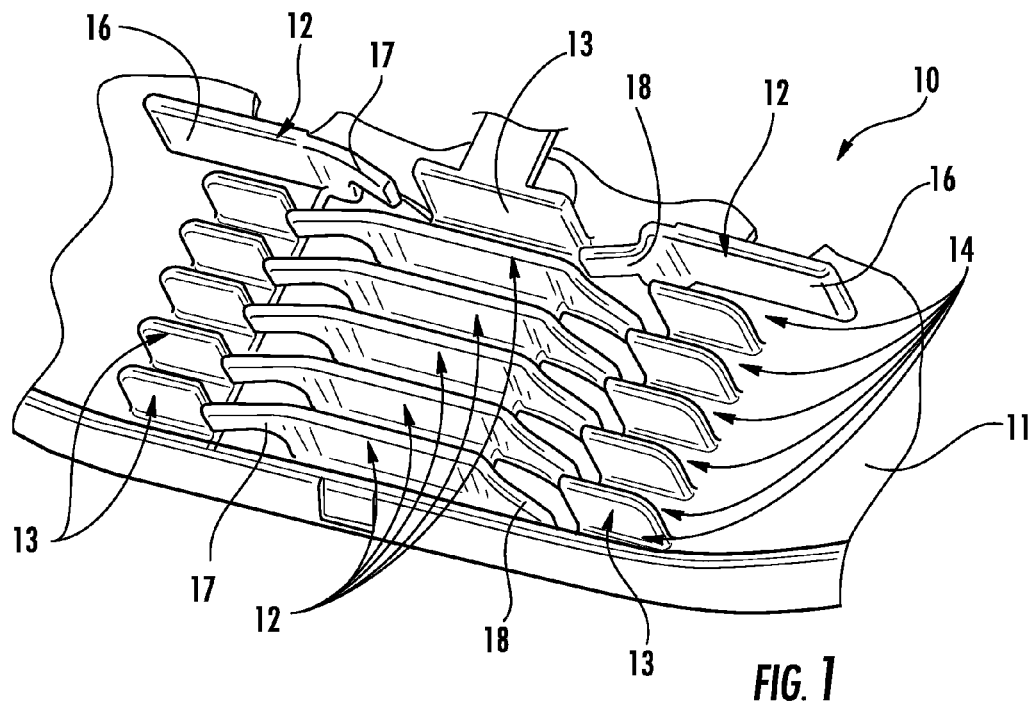
FIG. 1 shows a perspective view of a holding apparatus according to the invention for splice protection devices.
Figure 2:
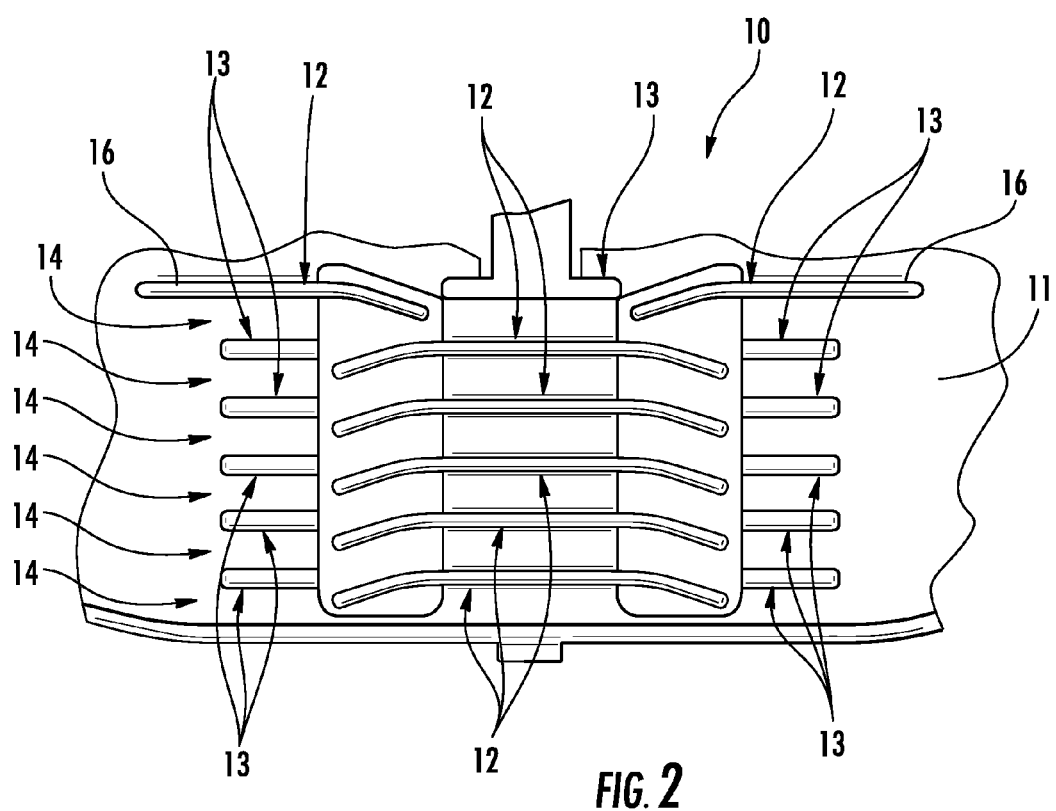
FIG. 2 shows a plan view of the holding apparatus in FIG. 1.

FIGS. 1 and 2 show different views of a holding apparatus 10 according to the invention for splice protection devices, the splice protection devices serving the purpose of accommodating splices between connected optical waveguides.

The holding apparatus 10 in FIGS. 1 and 2 comprises a base wall 11 and a plurality of separating elements 12, 13 which engage on the base wall 11, the separating elements 12, 13 defining accommodating regions 14, which run substantially parallel to one another, for accommodating in each case at least one splice protection device or demarcate them from one another.

FIGS. 3 to 9 each show different views of a detail of the holding apparatus 10 according to the invention in FIGS. 1, 2 in the region of such an accommodating region 14. In each case one splice protection device 15 having been inserted into the accommodating region 14 in FIGS. 8, 9.

As shown in FIGS. 3 to 9, the accommodating region 14 shown there is delimited at longitudinal sides by in each case one first separating element 12, and each first separating element 12 comprises a central, dimensionally stable section 16 and two lateral, elastically deformable sections 17, 18.

The central, dimensionally stable section 16 of the first separating element 12 engages directly on the base wall 11 of the holding apparatus 10. The elastically deformable sections 17, 18 of the first separating element 12 engage on the respective central section 16 of the respective first separating element 12, the base wall 11 being interrupted in the region of the elastically deformable sections 17, 18.

The lateral sections 17, 18 of the first separating elements 12, which engage on the respective central section 16 of the respective first separating element 12, are elastically deformable, each of these first separating elements 12, in an undeformed initial position (see in particular FIG. 4), protruding with the elastically deformable sections 17, 18 into one of the accommodating regions 14 for the or each splice protection device whilst reducing the effective width thereof In order to insert a splice protection device into the respective accommodating region 14, the elastically deformable sections 17, 18 of the first separating element 12, which protrudes into the respective accommodating region 14, can be deformed elastically out of this initial position whilst increasing the effective width of the respective accommodating region 14.

In FIG. 1, the maximum effective width of the accommodating region 14 shown there is characterized by the amount X. The amount X corresponds to the distance between the dimensionally stable sections 16 of the first separating elements 12, which delimit this accommodating region 14. In the undeformed initial position of the lateral, elastically deformable sections 17, 18 of the first separating elements 12, one of these first separating elements 12, which delimit the accommodating region 14, protrudes with the respective lateral sections 17, 18 into the respective accommodation region 14, in each case by the amount Y, where the following applies:

$$0.4*X \leq Y \leq 0.6*X.$$

Figure 3:
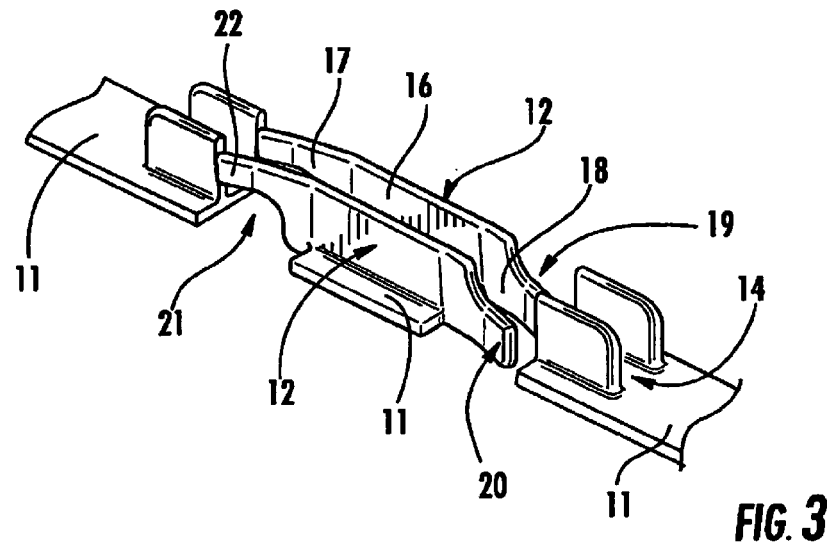
FIG. 3 shows a detail of the holding apparatus in FIG. 1.
Figure 4:
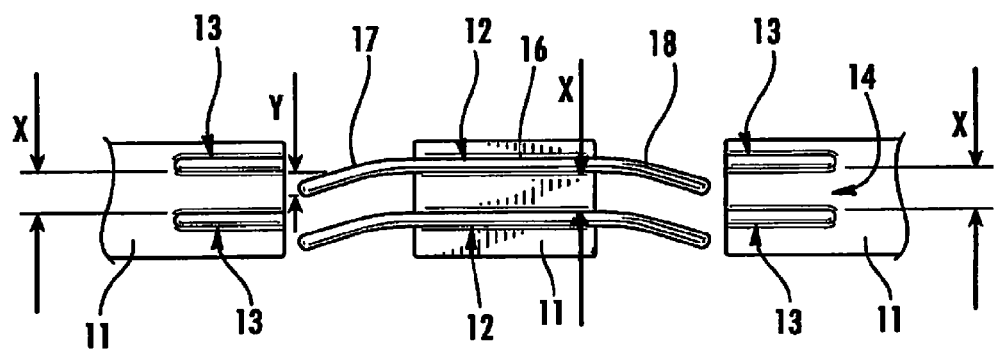
FIG. 4 shows the detail in FIG. 3 in a plan view.
Figure 5:
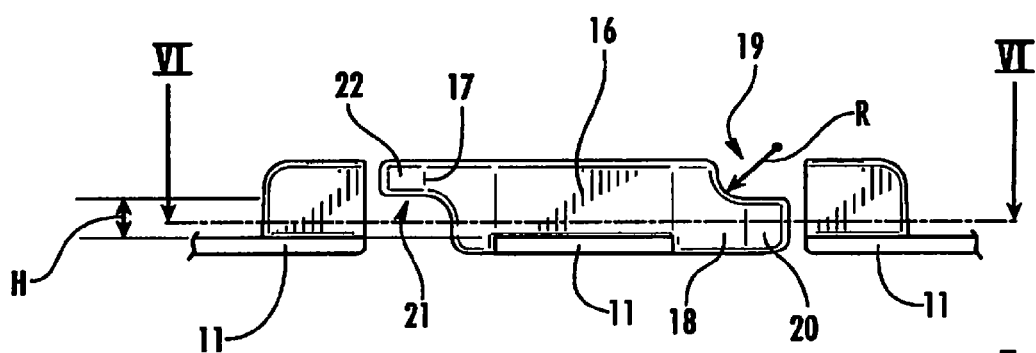
FIG. 5 shows the detail in FIG. 3 in a side view.

As can best be seen from FIGS. 3 and 5, recesses are associated with the first separating elements 12 in the lateral sections 17, 18.

A cutout 19, which in a lower region of the lateral section 18 defines a web-like projection 20, is associated with a first one of the elastically deformable sections, namely the section 18, of the first separating elements 12 in an upper region. A corresponding cutout 21, which delimits a web-like projection in an upper region of the lateral section 17, is associated with a second one of the elastically deformable sections, namely the section 17, of the first separating elements 12 in a lower region.

Figure 8:
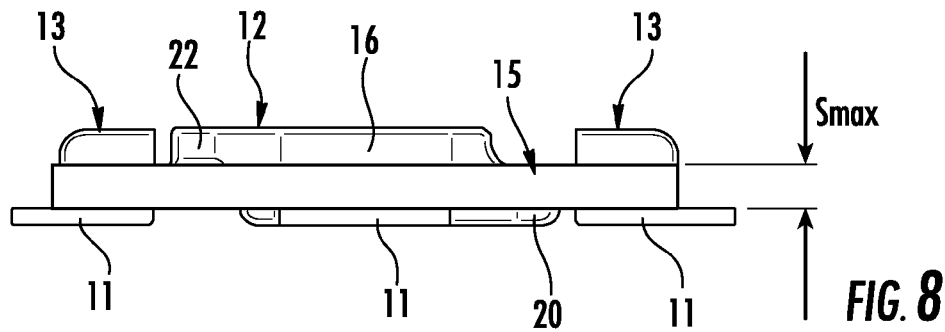
FIG. 8 shows the detail in FIG. 3 in a side view together with a splice protection device having the dimension $S_{max}$.
Figure 9:
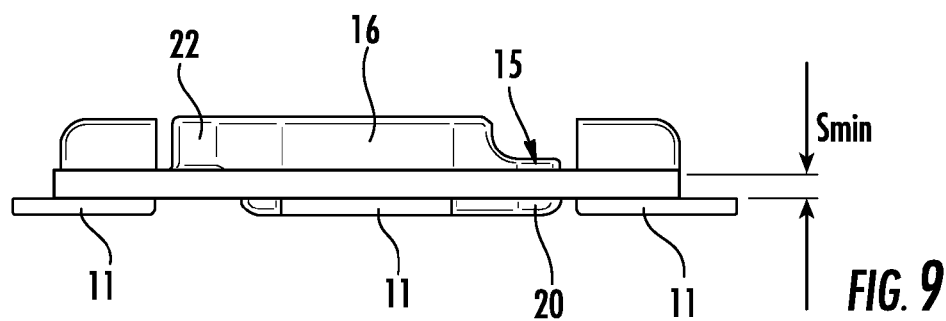
FIG. 9 shows the detail in FIG. 3 in a side view together with a splice protection device with the dimension $S_{min}$.

When, as shown in FIGS. 8 and 9, a splice protection device 15 is inserted into the respective accommodating region 14, the web-like projection 20 of the first elastically deformable section 18 of the first separating element 12, which protrudes into the respective accommodating region 14, bears against the accommodated splice protection device 15, to be precise for all splice protection devices whose dimension is between a maximum permissible diameter $S_{max}$ and a minimum permissible diameter $S_{min}$ of the splice protection device.

FIG. 8 shows a splice protection device 15 with a maximum permissible diameter $S_{max}$. FIG. 9 shows a splice protection device 15 with a minimum permissible splice protection diameter $S_{min}$.

When the splice protection device 15 is inserted into the respective accommodating region 14, as has already been mentioned the web-like projection 20 of the elastically deformable section 18 of the first separating element 12, which protrudes into the respective accommodating region 14, bears against the splice protection device 15. The web-like projection 22 of the elastically deformable section 17 of the first separating element 12, which protrudes into the respective accommodating region 14, on the other hand, does not bear against the splice protection device 15, to be precise neither in the case of a splice protection device 15 with a minimum permissible diameter $S_{min}$ nor in the case of a splice protection device 15 with a maximum permissible diameter $S_{max}$.

For this purpose, the height H (see FIG. 5) of the cutout 21 of the elastically deformable section 17 of the first separating element 12, which protrudes into the respective accommodating region 14, is greater than the maximum permissible diameter $S_{max}$ of the splice protection device 15. Accordingly, the following is true:

$$H > S_{max}.$$

As shown in FIG. 5, the cutouts 19, 21 of the elastically deformable, lateral sections 17, 18 of the first separating elements 12 have a rounded transition region, this rounded transition region forming the transition from the web-like projections 20, 22 formed by the cutouts 19, 21 to regions of the respective lateral sections 17, 18 which directly adjoin the dimensionally stable section 16. These rounded transition regions are characterized in FIG. 5 by a radius R, where the following is true for the radius R:

$$3*Z \leq R \leq 10*Z,$$

$$Z = S_{max} - S_{min}.$$

Accordingly, Z is the difference in diameter between a splice protection device with a maximum permissible diameter $S_{max}$ and a splice protection device with a minimum permissible diameter $S_{min}$.

Figure 6:
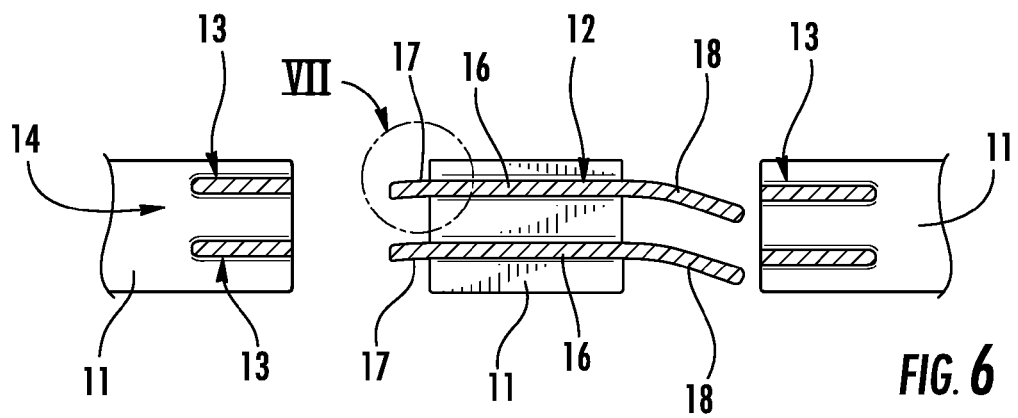
FIG. 6 shows a cross section through the detail in FIG. 3 along the sectional direction VI-VI in FIG. 5.
Figure 7:
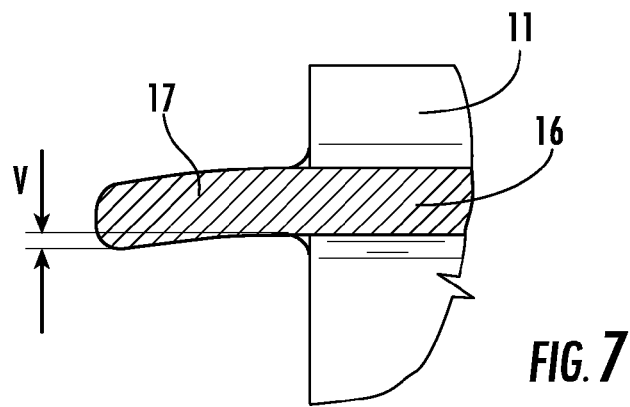
FIG. 7 shows the detail VII in FIG. 6.

FIGS. 6 and 7 show a cross section through the arrangement in FIG. 3 along the section line VI-VI in FIG. 5, which extends through the cutout 21 of the elastically deformable section 17 of a first separating element 12.

It can be seen from FIG. 7 that the region, which directly adjoins the central section 16, of the lateral, elastically deformable section 17 of the first separating element 12, which protrudes into the respective accommodating region 14 and into which the cutout 21 has not been introduced, protrudes into the accommodating region 14 by the amount V.

The following is true for the amount V:

$$0.1*Z \leq V \leq 0.2*Z,$$

$$Z = S_{max} - S_{min}.$$

As shown in FIGS. 3 to 9, in each case one second separating element 13, which engages in a dimensionally stable fashion on the base wall 11 and, together with the first separating element 12, delimits the respective accommodating region 14 on the respective longitudinal side thereof, is positioned adjacent to both sides of each first separating element 12. These second separating elements 13, in the same way as the dimensionally stable sections 16 of the first separating elements 12, engage on the base wall 11 and are dimensionally stable. The distance between second separating elements 13 which are positioned on different longitudinal sides of an accommodating region 14 is characterized by the amount X (see FIG. 4) in the same way as the distance between the corresponding dimensionally stable section 16 of the first separating elements 12.

In contrast to the exemplary embodiment shown, it is possible for a plurality of first separating elements 12 to be provided per longitudinal side which either protrude into the same accommodating region 14 or into different, adjacent accommodating regions.

It is also possible for each first separating element 12 to have only one elastically deformable section 17 or 18 in addition to the dimensionally stable section 16. This is shown in FIGS. 1, 2 for the uppermost accommodating region 14, which has, on the upper longitudinal side, two first separating elements 12 with in each case one dimensionally stable section 16 and only one elastically deformable section 17 or 18. In this case, a second, dimensionally stable separating element 13 is then positioned between the two first separating elements 12. For details on this reference is made to the above statements.

That which is claimed:

1. A holding apparatus for splice protection devices with splices, accommodated in the splice protection devices, of optical waveguides, comprising:
a base wall;
a plurality of second separating elements which engage on the base wall and are dimensionally stable, wherein the plurality of second separating elements demarcate accommodating regions from one another and are substantially parallel to one another, and each of the accommodating regions is configured to receive at least one splice protection device; and
at least one first separating element which delimits at least one of the accommodating regions at an at least one longitudinal side, each of the at least one first separating element is at least partially disposed between two of the plurality of second separating elements which are collinear,
wherein the at least one first separating element comprises a dimensionally stable section and at least one elastically deformable section, and wherein the dimensionally stable section engages on the base wall and the at least one elastically deformable section engages on the dimensionally stable section in such a way that the at least one elastically deformable section protrudes, in a undeformed initial position, into a respective accommodating region while reducing an effective width thereof and can be elastically deformed out of the undeformed initial position while enlarging the effective width of the respective accommodating region for the purpose of inserting a splice protection device into the respective accommodating region.

2. The holding apparatus of claim 1, wherein the base wall is interrupted in a region of the at least one elastically deformable section.

3. The holding apparatus according to claim 1, wherein the at least one elastically deformable section comprises a first elastically deformable section and a second elastically deformable section,
wherein the first elastically deformable section is located laterally on one end of the dimensionally stable section, and the second elastically deformable section is located laterally on another end of the dimensionally stable section.

4. The holding apparatus of claim 1, wherein the accommodating region has a maximum effective width X in the undeformed initial position, and wherein one of the first elastically deformable section and the second elastically deformable section protrudes into the respective accommodating region by an amount Y defined by $0.4*X \leq Y \leq 0.6*X$.

5. The holding apparatus of claim 1, wherein at least one second separating element engages in a dimensionally stable fashion on the base wall, and wherein the at least one second separating element is positioned at least adjacent the at least one first separating element.

6. A holding apparatus for splice protection devices with splices, accommodated in the splice protection devices, of optical waveguides, comprising:
a base wall;
a plurality of second separating elements which engage on the base wall, wherein the plurality of second separating elements demarcate accommodating regions from one another and are substantially parallel to one another, and each of the accommodating regions is configured to receive at least one splice protection device; and
at least one first separating element which delimits at least one of the accommodating regions at an at least one longitudinal side,
wherein the at least one first separating element comprises a dimensionally stable section and at least one elastically deformable section, and wherein the dimensionally stable section engages on the base wall and the at least one elastically deformable section engages on the dimensionally stable section in such a way that the at least one elastically deformable section protrudes, in a undeformed initial position, into a respective accommodating region while reducing an effective width thereof and can be elastically deformed out of the undeformed initial position while enlarging the effective width of the respective accommodating region for the purpose of inserting a splice protection device into the respective accommodating region,
wherein the at least one elastically deformable section comprises a first elastically deformable section and a second elastically deformable section,
wherein the first elastically deformable section is located laterally on one end of the dimensionally stable section, and the second elastically deformable section is located laterally on another end of the dimensionally stable section, and
wherein the first elastically deformable section has a cutout in an upper region and a projection in a lower region, and the second elastically deformable section has a cutout in a lower region and a projection in an upper region.

7. The holding apparatus of claim 6, wherein when a splice protection device is inserted into the respective accommodating region, the projection of the second elastically deformable section does not bear against the splice protection device.

8. The holding apparatus according to claim 6, wherein when a splice protection device is inserted into the respective accommodating region, the projection of the first elastically deformable section bears against the splice protection device.

9. The holding apparatus of claim 6, wherein the cutout of the first elastically deformable section and the cutout of the second elastically deformable section each has a rounded transition region which directly adjoins the dimensionally stable section, and wherein a radius R of the rounded transition region is defined by $3*Z \leq R \leq 10*Z$, where Z is a difference in diameter between a splice protection device with a maximum permissible diameter $S_{max}$ and a splice protection device with a minimum permissible diameter $S_{min}$.

10. The holding apparatus of claim 9, wherein one of the first elastically deformable section and the second elastically deformable section protrudes into the respective accommodating region by an amount V, where V is defined by $0.1*Z \leq V \leq 0.2*Z$.

* * * * *